United States Patent [19]

Takahashi et al.

[11] Patent Number: 4,953,887
[45] Date of Patent: Sep. 4, 1990

[54] BABY CARRIAGE CAPABLE OF SERVING AS SHOPPING CAR

[75] Inventors: Takehiko Takahashi; Hitoshi Kato, both of Tokyo, Japan

[73] Assignee: Combi Co., Ltd., Tokyo, Japan

[21] Appl. No.: 321,709

[22] Filed: Mar. 10, 1989

[30] Foreign Application Priority Data

Jul. 18, 1988 [JP] Japan .............................. 63-93994[U]
Aug. 3, 1988 [JP] Japan ........................... 63-102941[U]

[51] Int. Cl.⁵ ................................................ B62B 9/12
[52] U.S. Cl. .................................... 280/647; 280/650; 280/47.38; 280/658
[58] Field of Search ................ 280/647, 33.992, 47.38, 280/644, 650, 658; 224/273, 42.42 R; 297/189, 192, 193; 403/119, 150, 407.1, 59

[56] References Cited

U.S. PATENT DOCUMENTS 4,763,919 8/1988 Nakao et al. ......................... 280/644
4,765,644 8/1988 Bell ..................................... 280/644

FOREIGN PATENT DOCUMENTS 56-25980 6/1981 Japan .................................... 280/644

Primary Examiner—Charles A. Marmor
Assistant Examiner—Richard Camby
Attorney, Agent, or Firm—Sughrue, Mion, Zinn, Macpeak & Seas

[57] ABSTRACT

A baby carriage capable of serving as a shopping car in which an article-holding container (8) of a large capacity is mounted on the underside of the carriage. In particular, the article-holding container is foldably and detachably mounted below and to the rear of a seat plate (6) of the carriage. Once detached from the carriage, the container can be used as a hand held shopping basket. The container includes a U-shaped frame bar (81) and a pair of engaging members (9) mounted on the upper surfaces of the front end portions of the frame bar. The engaging members are detachably positioned in a pair of holders (10) mounted on the underside of the seat plate.

4 Claims, 4 Drawing Sheets

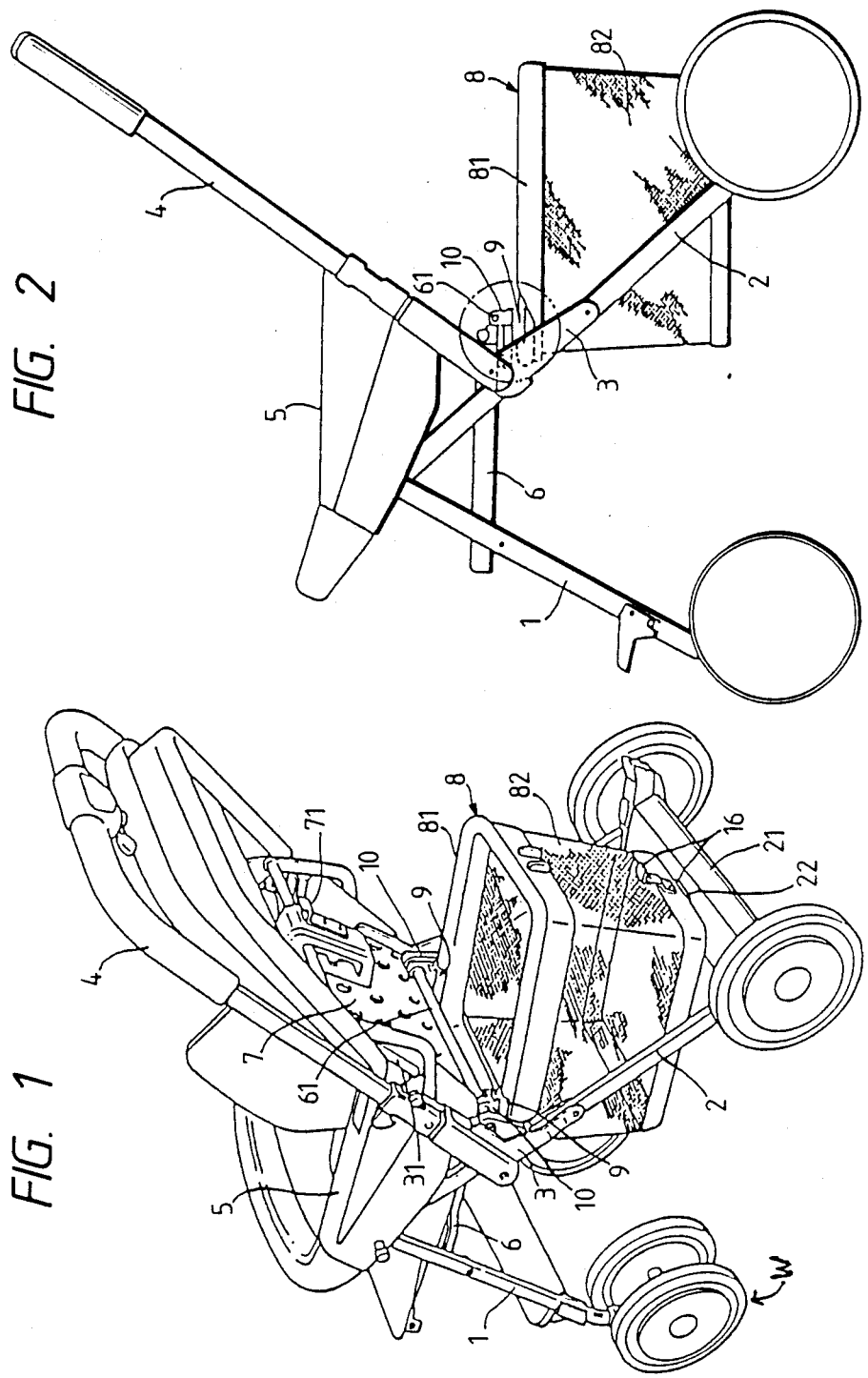

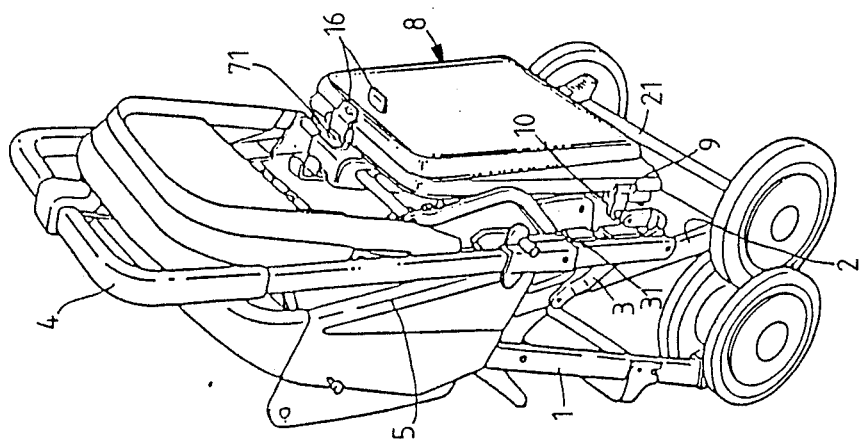
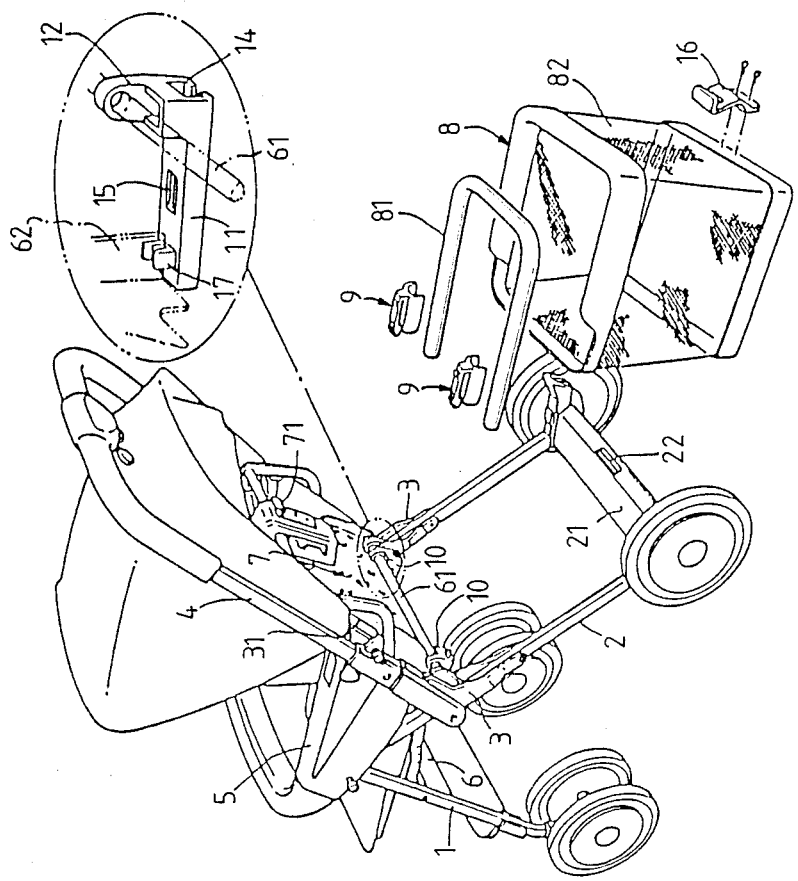

BABY CARRIAGE CAPABLE OF SERVING AS SHOPPING CAR

BACKGROUND OF THE INVENTION

The present invention relates to a baby carriage or stroller capable of serving as a shopping car in which an article-holding container such as a basket is mounted below a seat plate at a rear portion thereof in a foldable manner, and the article-holding container is detachable from its mounting portion as required so as to be carried.

There are known various baby carriages or strollers in which a baby can be taken about.

However since the main purpose of such conventional baby carriages is to carry the baby, there have been few known baby carriages of the type which are designed to be able to carry both the baby and articles in an effective manner.

More specifically in the conventional baby carriages, an article-holding container of a small size such as a basket is mounted below a seat plate. In this case because of limitations imposed by a folding mechanism of the baby carriage or structural limitations relating to the handling, etc., of the baby carriage, the article-holding container must be mounted directly under the underside of the seat plate (i.e., in a plane of projection thereof).

Apart from the case where such an article-holding container is of a relatively shallow dish-shape if it is desired to provide an article-holding container having a greater depth so as to increase its capacity the spacing between the underside of the seat plate and the open top of the article-holding container becomes smaller in which case an article has to be put into the container through this small spacing Thus the conventional article-holding container has the drawback that the overall open top of the container cannot effectively be utilized.

To overcome the above problem, the inventor of the present invention has proposed a construction as disclosed in Japanese Utility Model Application No. 46700/1987, Laid Open on Oct. 31, 1988, and corresponding to U.S. Copending Application No. 07/175,426, filed Mar. 30, 1988. In this construction, the article-holding container is withdrawable rearwardly from beneath the seat plate. Thus, when putting an article into the article-holding container, the container is withdrawn rearwardly, and therefore the depth of the article-holding container can be so increased that its upper end is disposed in contact with the underside of the seat plate. Thus, this construction has the advantage that the capacity of the article-holding container can be greatly increased.

The above construction has been found to be inconvenient, however, in that although the article-holding container can be slidingly withdrawn rearwardly from beneath the baby carriage body the container cannot be detached from the baby carriage body and therefore cannot be used as a shopping basket when doing the shopping.

SUMMARY OF THE INVENTION

With the above-mentioned problems in view it is an object of the subject invention to provide a baby carriage capable of serving as a shopping car in which an article-holding container of a large capacity is mounted on the underside of the baby carriage. In particular the article-holding container is mounted below a seat plate at a rear portion thereof on which seat plate the baby is to be seated. Further, the article-holding container is detachable from the baby carriage body as required for use as a container for holding articles at the time of shopping.

Another object is to provide the baby carriage capable of serving as a shopping car in which the article-holding container can be folded up in a direction of its height (thickness) and then be held against the rear side of the backrest of the baby carriage when there is no need to use the container or when the baby carriage body is folded up, thereby enabling a compact folding of the article-holding container.

A further object is to provide a baby carriage capable of serving as a shopping car in which holders which hold front end portions of a frame bar of the article-holding container so that the article-holding container can be stably held below the seat plate at a rear portion thereof are swingingly movable in response to the folding of the baby carriage so that the holders will not interfere with the folding of the baby carriage.

The present invention is applicable to a conventional baby carriage and is characterized in that an article-holding container is foldably and detachably mounted below a baby-supporting seat plate at a rear portion thereof through holders connectable to an upper end of the article-holding container which defines a large opening.

BRIEF DESCRIPTION OF THE DRAWINGS

Other features and advantages of the present invention will be apparent from the following description taken in connection with the accompanying drawings wherein:

FIG. 1 is a perspective view showing both a baby carriage body and an article-holding container in their assembled conditions;

FIG. 2 is a side-elevational view of the baby carriage of FIG. 1;

FIG. 9 is a developed perspective view of the baby carriage of FIG. 1, showing a part thereof on an enlarged scale; and FIG. 10 is a perspective view showing the baby carriage body and the article-holding container in their folded conditions.

DETAILED DESCRIPTION OF THE PREFERRED EMBODIMENTS

Figure 3:
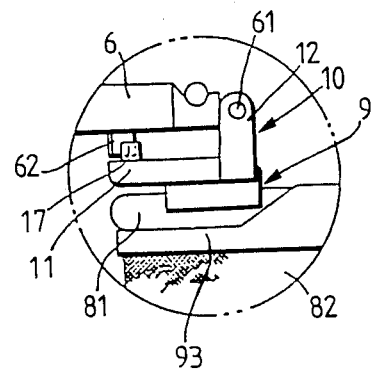
FIG. 3 is an enlarged, side-elevational view of that portion of FIG. 2 encircled by a dots-and-dash line, showing a connection between a holder and an engaging portion.
Figure 4:
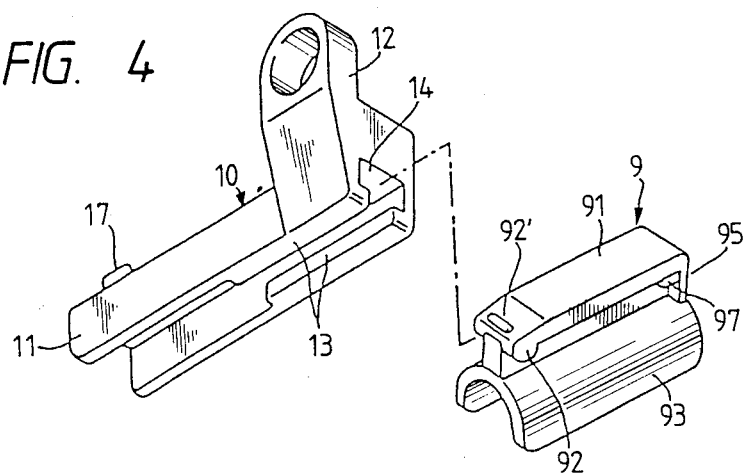
FIG. 4 is a developed, perspective view of the holder and engaging portion, with the holder shown as viewed from its lower side.
Figure 5:
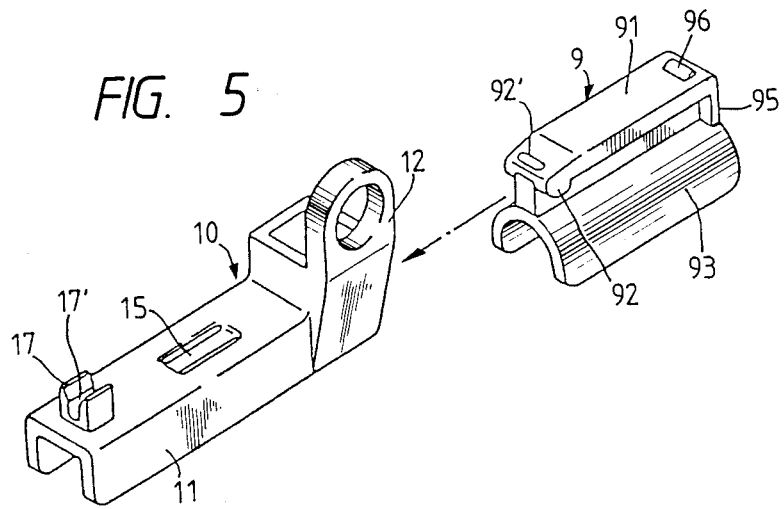
FIG. 5 is a perspective view similar to FIG. 4 but showing the holder as viewed from its upper side.

Embodiments of the present invention will now be described with reference to the drawings.

A baby carriage or stroller shown in the drawings is of the conventional type having wheels W, and its frame is constituted by front leg bars 1, rear leg bars 2, a push handle bar 4 and arm rest members 5. Each pair of front and rear leg bars 1 and 2 are pivotally connected together at their upper ends so that they are pivotally movable toward and away from each other. The push handle bar 4 is pivotally connected through brackets 3 at its lower ends to the rear leg bars 2 above central portions thereof in the direction of the length thereof, and extends upwardly. Each arm rest member 5 extends between and is mounted on a support bar 31 extending upwardly from each rear leg bar 2 and the pivotal portion at which the upper ends of the front and rear leg bars 1 and 2 are pivotally connected together.

Reference numeral 6 denotes a seat plate which is mounted on and extends to the front leg bars 1, 1 and the rear leg bars 2. 2. A backrest plate 7 extends upwardly from and is pivotally connected to the rear end portion of the seat plate 6 for movement between an upper and a lower position in such a manner that an inclination of the backrest plate 7 is adjustable.

Reference numeral 8 denotes an article-holding container which comprises a frame bar 81 having a U-shape as seen from above and a bag 82 of a net suspended from the frame bar 81 to provide a deep basket-like configuration having an open top.

Engaging members 9, 9 are mounted respectively on upper surfaces of the U-shaped frame bar 81 adjacent to front ends thereof. The engaging members 9, 9 are detachably fitted respectively in holders 10, 10 mounted on the rear end of the seat plate 6 in facing relation to the underside of the seat plate 6 so that the frame bar 81 can be connected to the seat plate 6 in an integral manner.

As best shown in FIGS. 4 to 8 each holder 10 includes a downwardly-opening elongated body 11 of an inverted U-shape and an upstanding mounting arm 12 of a suitable height formed on a proximal end of the body 11.

A pair of inwardly-directed narrow flanges 13, 13 are formed on front half portions of lower edges of the inverted U-shaped body 11. respectively, (see FIGS. 4 and 6 to 8).

The flanges 13. 13 serve to form an engaging groove 14 in which the engaging member 9 is fitted as later described. The distal ends of the flanges 13, 13 are adapted to engage with a downwardly-directed retainer projection 92 formed at the front end of an engaging portion 91 so as to prevent the engaging member 9 from accidentally becoming disengaged from the holder 10.

Reference numeral 15 denotes a plate-like resilient portion which is formed at an upper wall of the holder body 11, that portion of the holder body 11 being formed into a slightly reduced thickness, so that the resilient portion produces a resilient force (downward force) when it is raised. The resilient portion 15 has a downwardly-directed retainer projection 15' on its lower surface (see FIG. 6).

Figure 6:
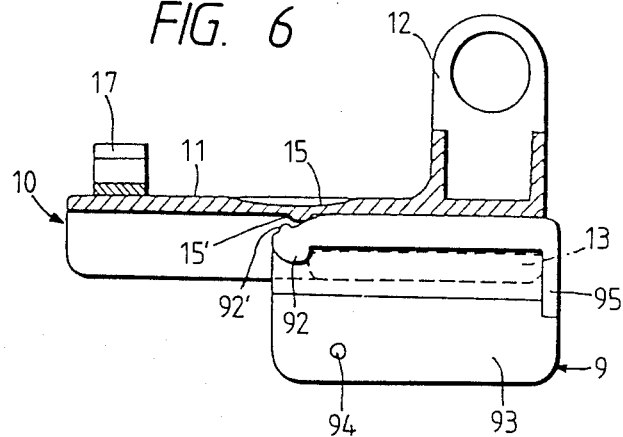
FIG. 6 is an enlarged cross-sectional view showing the holder and the engaging portion fitted in the holder.
Figure 7:
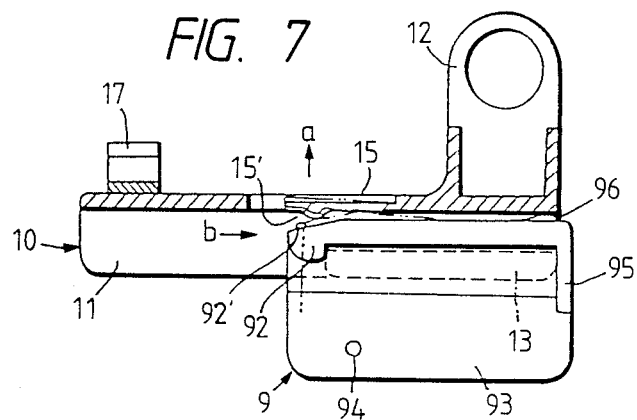
FIG. 7 is an enlarged, cross-sectional view showing a modified holder and a modified engaging portion fitted in this holder.
Figure 8:
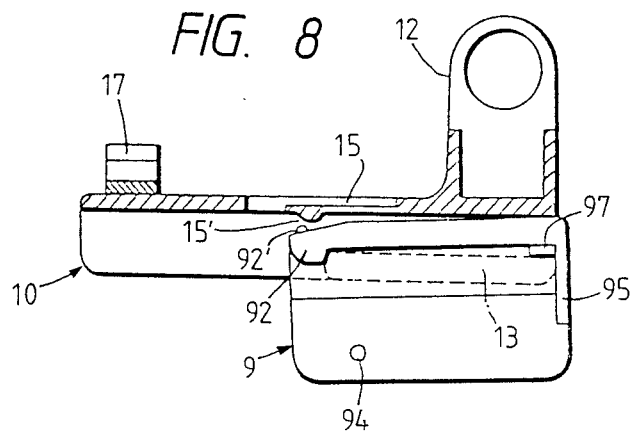
FIG. 8 is an enlarged, cross-sectional view showing the holder of FIG. 7 and another modified engaging portion fitted in this holder.

The resilient portion 15 formed by reducing its thickness as shown in FIG. 6 may be replaced by a plate-like resilient portion 15 of the cantilever type as shown in FIGS. 7 and 8 in which case one end of the narrow plate-like portion being notched so that it is supported only at its proximal end. In this case, also the resilient portion 15 of the cantilever type has a retainer projection 15' on a lower surface thereof. Reference numeral 17 denotes a holder block of a U-shape which is formed on the upper surface of the holder 10 at its distal end portion. In the usable condition in which each holder 10 is maintained horizontally for suspending and holding the article-holding container 8, an insertion plate 62 projecting from a lower surface of the seat plate 6 is fitted in a holder groove 17' of the holder block 17 and held by it (see FIGS. 2 and 3).

The engaging member 9 is constituted by a mounting portion 93 of a semi-circular cross-section and the engaging portion 91 of a T-shaped cross-section formed on an upper surface of the mounting portion 93.

The mounting portion 93 is mated with the upper surface of the frame bar 81 of the article-holding container 8 and fixed thereto. The downwardly-opening mounting portion 93 of a semi-circular cross-section is mated with the upper half portion of the frame bar 81 and is fixedly secured thereto by fastening pins (not shown) or the like. Reference numeral 94 denotes apertures 94 through which the fastening pins pass.

Upper ends of the mounting arms 12 of the holders 10 are mounted respectively on opposite ends of a connecting bar 61 connecting the seat plate 6 and the backrest plate 7 together.

The engaging portion 91 of a T-shaped cross-section is of such a size as to be fitted in the engaging groove 14, and an upper surface of the engaging portion 91 is slanting slightly downwardly at its front end portion. A retainer projection 92' of a smaller height is formed on this slanting surface, and a relatively large retainer projection 92 is formed on a lower surface of the engaging portion 91 at its front end.

Reference numeral 95 denotes a stop portion which is formed at the rear end of the engaging portion 91 so as the prevent the engaging portion 91 from being inserted into the engaging groove 14 beyond the stop portion.

The engaging portion 91 has a thickness substantially equal to the thickness of the engaging groove 14 throughout its entire length except for its front end as shown in FIG. 6. Alternatively as shown in FIG. 7, the engaging portion 91 may be reduced to a thickness slightly smaller than the thickness of the engaging groove 14 so that the engaging portion 91 is freely slidable along the engaging groove 14, in which case a projection 96, having a height corresponding to the spacing formed between the upper surface of the engaging portion 91 and the upper wall of the engaging groove 14, is formed on the upper surface of the engaging portion 91 only at its rear end.

Further as shown in FIG. 8, the engaging portion 91 may be reduced into a thickness slightly smaller than the thickness of the engaging groove 14 to enable a free sliding movement of the engaging portion 91 along the engaging groove 14 is described above for the embodiment of FIG. 7, in which case a stepped portion 97, having a height corresponding to the spacing formed between the upper surface of the engaging portion 91 and the upper wall of the engaging groove 14 is formed on the front face of the stop portion 95. In this case, when the engaging member 9 is fully inserted into the engaging groove 14, the stepped portion 97 runs on the upper surfaces of the flanges 13 so that the rear end of the engaging member 9 can close the proximal end of the engaging groove 14.

Reference numeral 16 denotes engaging hooks which are secured to a rear lower end portion of the article-holding container 8, and in the usable condition, one of the hooks 16 is engageable in an engaging hole 22, formed in a step plate 21 mounted on the lower end portions of the rear leg bars 2, 2 to connect them together whereas in the folded condition, the other hook is engageable with an engaging plate 71 provided on the rear face of the backrest plate 7.

Although not shown in the drawings, it is preferred that the handgrip straps should be attached to the frame bar 81 of the article-holding container 8 to facilitate the carrying of the container when doing the shopping.

The construction of the article-holding container 8 is not to be restricted to the illustrated embodiment, and various constructions may be used.

The above-mentioned construction of the present invention is used as follows:

Use of the Article-Holding Container (1) The case where the baby carriage is in its folded condition as shown in FIG. 10:

Although the baby carriage body is folded in a known manner, the article-holding container 8 attached thereto is folded in such a manner that the bottom plate portion of the container is urged toward the frame bar 81.

When the article-holding container 8 is in its folded condition (in which the frame bar 81 is disposed adjacent to the rear face of the backrest plate 7 as a result of movement into a generally upstanding position in response to the folding of the article-holding container 8). the holder 10, in which the engaging member 9 mounted on the front end of the frame bar 81 is fitted, is also held in a generally upstanding position in abutting relation to the rear side of the seat plate 16. This positioning results because of the disengagement of the insertion plate 62 on the lower surface of the seat plate 6 from the holder block 17 formed on the upper surface of the holder body 11 at its front end portion and the subsequent angular movement of the holder 10 about the mounting arm 12.

In a known manner, this folded condition of the thus folded baby carriage is first released and it is assembled.

In the assembled condition of the baby carriage, the engaging hook 16 secured to the rear end of the article-holding container 8 is still held in engagement with the engaging plate 71 provided on the rear face of the backrest plate 7 so that the article-holding container 8 is still maintained in its folded condition. Therefore this engagement is released.

When the engagement of the engaging hook 16 with the engaging plate 71 is released, the article-holding container 8 is angularly moved downwardly about the mounting arms 12 serving as a fulcrum and formed on the upper surfaces of the holders 10 at their proximal ends which holders are connected to the front ends of the frame bar 81, respectively. When each holder 10 is angularly moved downwardly, the holder groove 17, of the holder block 17 provided on the upper surface of the holder at the distal end thereof holds the insertion plate 62 projecting from the lower surface of the seat plate 6, thereby firmly holding the frame bar 81 of the article-holding container 8 to prevent it from swingably moving unnecessarily.

When the article-holding container 8 is expanded in response to the above operation the lower surface of its rear end portion is placed on the step plate 21. And, by inserting the engaging hook 16 on the lower surface of the container 8 in the engaging hole 22 in the step plate 21 and fixing it thereto, the article-holding container 8 can be used in a stable manner.

(2) The case where the baby carriage is already in its assembled condition (usable condition):

In this case, the latter portion of the above-mentioned operation has only to be done. More specifically, when the engagement of the engaging hook 16 with the engaging plate 71 provided on the rear face of the backrest plate 7 is released, the article-holding container 8 is angularly moved downwardly about the mounting arms 12 serving as a fulcrum and formed on the upper surfaces of the respective holders 10 connected to the front ends of the frame bar 81. When the holders 10 are angularly moved downwardly, the holder grooves 17' of the holder blocks 17 provided on the upper surfaces of the respective holders 10 at their distal ends hold the respective insertion plates 62, thereby firmly holding the frame bar 81 of the article-holding container 8 to prevent it from swingably moving unnecessarily.

The article-holding container 8 can be used merely by placing its lower surface of its rear end portion on the step plate 21 and engaging the engaging hook 16 in the engaging hole 22 formed in the step plate 21.

Removal of the Article-Holding Container (1) Re: the embodiment of FIG. 6

In this case, first, the rear portion of the U-shaped frame bar 81 of the article-holding container 8 is grasped and is slightly pushed downwardly.

When the rear portion of the U-shaped frame bar 81 is pushed downwardly the front end portion of each engaging portion 91 of the engaging member 9 mounted on the frame bar 81 adjacent to the front end thereof is raised, so that the locking engagement of the downwardly-directed retainer projection 92 on the front end of the engaging portion 91 with the front ends of the flanges 13 is released.

When the locking engagement of the retainer projection 92 with the flanges 13 is released, the engaging portion 91 is free to slidingly move rearwardly along the engaging groove 14.

In this condition if the frame bar 81 is forcibly withdrawn rearwardly the retainer projection 92, formed on the upper surface of the engaging portion 91 at its front end moves rearwardly and raises the retainer projection 15, on the lower surface of the resilient portion 15 and slides over it. Nothing further prevents the engaging portion 91, which has slid over the retainer projection 15' from sliding movement, so that the article-holding container 8 can be easily detached.

The article-holding container 8 thus detached from the holders 10 can be used as a portable container for holding purchased articles or the like. In this case, the holders 10 are mounted at the rear side of the seat plate 6 and maintained in a horizontal position.

(2) Re: the embodiments of FIGS. 7 and 8

In this case, also, the rear portion of the U-shaped frame bar 81 of the article-holding container 8 is first grasped and slightly pushed downwardly, as described above.

When the rear portion of the U-shaped frame bar 81 is pushed down, the projection 96 (the embodiment of FIG. 7) formed on the upper surface of the rear portion of the engaging portion 91 of each engaging member 9 mounted on the U-shaped frame bar 81 adjacent to its front end or the stepped portion 97 (the embodiment of FIG. 8) serves as a fulcrum of a lever, so that the front end portion of the engaging portion 91 is raised as indicated by an arrow a in FIG. 7. As a result the locking engagement of the downwardly-directed retainer projection 92 on the front end portion of the engaging portion 91 with the front ends of the flanges 13 is released.

When the locking engagement of the retainer projection 92 with the flanges 13 is released, the engaging portion 91 is free to slidingly move rearwardly along the engaging groove 14.

In this condition if the frame bar 81 is forcibly withdrawn rearwardly as indicated by an arrow b in FIG. 7, the retainer projection 92' formed on the upper surface of the engaging portion 91 at its front end moves rearwardly and raised the retainer projection 15 on the lower surface of the resilient portion 15 and slides over it.

Nothing further prevents the engaging portion 91, which has slid over the retainer projection 15', from sliding movement, so that the article-holding container 8 can be easily detached.

Attachment of the Article-Holding Container

When the article-holding container 8 removed from the baby carriage for carrying purposes is to be attached to it, all that has to be done is to fit the engaging members 9 mounted on the frame bar 81 of the article-holding container 8 adjacent to their front ends in the respective holders 10. More specifically the front end portion of the engaging portion 91 of a T-shaped cross-section formed on the upper surface of the semi-circular mounting portion 93 is inserted in the engaging groove 14. When the engaging portion 91 thus inserted in the engaging groove 14 advances, the retainer projection 92' formed on its upper surface at its front end portion is brought into contact with the retainer projection 15' on the lower surface of the resilient portion 15, so that the engaging portion 91 is prevented from further advancing. But the engaging portion 91 can further be advanced by forcing it forwardly to cause its front end portion to raise the resilient portion 15.

In this condition, when the engaging portion 91 is further moved forwardly its front end portion reaches the distal ends of the flanges 13.

The front end portion of the engaging portion 91, when it travels beyond the distal ends of the flanges 13, is caused to move downwardly since it is no longer raised by the flanges As a result, the retainer projection 92 formed on the lower surface of the front end of the engaging portion 91 is lockingly engaged with the distal ends of the flanges 13 to achieve an anchoring effect thereby preventing the disengagement thereof.

In this condition, the load of the article-holding container 8 is applied to the engaging members 9 in a concentrated manner and therefore the holders 10 supporting them are also raised at their distal end portions, so that the holding of the insertion plates 62 by the respective holder blocks 17 formed on the upper surfaces of the holders 10 at their distal end portion is firmly effected thus finishing the attachment operation in such a manner that the article-holding container 8 is held in a stable manner.

The advantageous effects of the above-mentioned constructions of the present invention are as follows:

(1) The article-holding container 8 which has conventionally been fixedly mounted beneath the seat plate 6 is disposed below the seat plate 6 at the rear portion of the seat plate 6. Therefore, the size of the article-holding container 8 can be made much greater since the height of the upper end of the container is not restricted by the lower surface of the seat plate 6.

More specifically, although the article-holding container 8 is of a great size the upper opening of the container can be fully used effectively as an opening for introducing articles since the container 8 is mounted below the seat plate 6 at the rear portion thereof. Thus, the problems of introducing the articles which the conventional large-size article-holding containers have had because of a small spacing between the upper opening of the container and the lower surface of the seat plate are completely solved.

(2) The engaging members 9 mounted on the front end portions of the frame bar 81 are releasably attached to the respective holders 10 so that the article-holding container 8 can be detached as required. Therefore, the article-holding container 8 can be used as a shopping basket when doing the shopping, thereby eliminating the troublesome need for preparing a separate shopping basket.

(3) The article-holding container 8 can be detached and used as a shopping basket, and when the shopping is finished, the article-holding container 8 can be attached to the baby carriage merely by fitting the engaging members 9, 9, mounted on the frame bar 81 adjacent to its front ends into the respective holders 10, 10, thereby completely obviating the cumbersome need for shifting the purchased articles from the separate shopping basket to the article-holding container as is the case with the prior art. Thus, the article-holding container 8 is convenient in this respect.

(4) When the engaging members 9. 9 are fitted in the respective holders 10, 10, the retainer projection 92 formed on the lower surface of each engaging portion 91 at its front end passes over the front ends of the flanges and becomes lockingly engaged therewith. Therefore, there is no fear that the engaging members 9, 9 will be accidentally disengaged from the respective holders 10, 10 after the fitting operation is finished, and thus can be attached quite safely.

(5) The holder 10 has the plate-like resilient portion 15 having the downwardly-directed retainer projection 15, formed on its lower surface. The retainer projection 15, is engageable with the retainer projection 92 formed on the upper surface of the engaging portion 91 at its front end portion. Therefore, even if the locking engagement of the retainer projection 92 with the distal ends of the flanges 13 should be released, the retainer projection 92' is brought into locking engagement with the retainer projection 15 and maintained in this condition. Therefore, unless the frame bar 81 is forcibly withdrawn, there is no fear that the engaging members 9, 9 will become disengaged from the respective holders 10, 10. Thus, there is provided a double safety means.

(6) Each holder 10 for supporting the frame bar 81 is pivotally connected to the rear end of the seat plate 6 in facing relation to the underside of the seat plate 6 so as to be angularly movable. Therefore, when it is required to fold up the baby carriage, the position of the holder is shifted in response to the folding of the baby carriage. Therefore, this overcomes various difficulties which would be caused by an immovable mounting of the holder, such as interference with the angular movement of the frame bar 81 at the time of folding the article-holding container 8, thereby ensuring a smooth folding operation.

(7) The holder 10 has the holder block 17 provided on its upper surface at its distal end portion for holding the insertion plate 62 projecting from the lower surface of the seat plate 6. Therefore, the holder 10 supporting the article-holding container 8 can hold it in a stable manner.

(8) The shopping basket attached to the conventional baby carriage is automatically brought into its usable condition when the baby carriage body is brought into its assembled condition. On the other hand, in the present invention, the article-holding container 8 can be maintained in its folded condition and held in locking engagement with the rear side of the backrest plate 6. Therefore, when the article-holding container 8 is not to be used, the baby carriage can be used in a compact manner as a whole.

What is claimed is:

1. A baby carriage capable of serving as a shopping car comprising a frame, a seat plate, a back rest means and a plurality of wheels mounted to said frame; further wherein an article-holding container of which an upper end defines a large opening is detachably mounted below said seat plate at a rear portion of said seat plate on which seat plate a baby is to be seated; said article-holding container includes a frame bar having a U-shape as seen from above and engaging members mounted respectively on upper surfaces of front end portions of said frame bar; and said engaging members are detachably fitted respectively in holder mounted on the underside of said seat plate at opposite sides of said seat plate, wherein each of said holders includes a downwardly-opening holder body of an inverted U-shaped cross-section and a mounting arm of a suitable height extending upwardly from the upper surface of said holder body at a proximal end portion thereof, said holder body having a plate-like resilient portion provided at an upper wall of said holder body at a central portion thereof, each said engaging member fittable in each said holder includes a mounting portion and an engaging portion of a T-shaped cross-section formed on an upper surface of said mounting portion and a disengagement-prevention retainer projection being formed on a lower surface of said engaging portion at its front end portion.

2. A baby carriage capable of serving as a shopping car comprising a frame, a seat plate, a back rest means and a plurality of wheels mounted to said frame; further wherein an article-holding container of which an upper end defines a larger opening is detachably mounted below said seat plate at a rear portion of said seat plate on which seat plate a baby is to be seated; said article-holding container includes a frame bar having a U-shape as seen from above and engaging members mounted respectively on upper surfaces of front end portions of said frame bar; and said engaging members are detachably fitted respectively in holders mounted on the underside of said set plate at opposite sides of said seat plate, wherein each of said holders is pivotally movable at said rear portion of said seat plate about a mounting arm formed on the upper surface of each said holder body at its proximal end portion and serving as a fulcrum for said pivotal movement.

3. A baby carriage capable of serving as a shopping car according to claim 2, in which each said holder has a holder block formed on its upper surface at its distal end portion for holding an insertion plate provided on said rear portion of said seat plate.

4. A baby carriage capable of serving as a shopping car, comprising:
   a frame;
   a seat plate on which a baby is to be seated;
   a back rest;
   a plurality of wheels mounted to said frame;
   an article-holding container having an upper end with a large opening and detachably mounted below said seat plate at a rear portion of said seat plate, said article-holding container including a frame bar having a U-shape a seen from above;
   engaging members mounted respectively on upper surfaces of front end portions of said frame bar, each of said engaging member having a mounting portion and an engaging portion of a T-shaped cross-section formed on an upper surface of said mounting portion; and
   holders mounted on the underside of said seat plate at opposite sides of said seat plate, each of said holders having a downwardly-opening holder body of an inverted U-shaped cross-section and a mounting arm of a predetermined height extending upwardly from the upper surface of a proximal end portion of said holder body, said engaging members being detachably fitted respectively in said holders.

* * * * *